(12) United States Patent
Leonard et al.

(10) Patent No.: US 8,899,438 B2
(45) Date of Patent: Dec. 2, 2014

(54) QUICK ATTACHING CHAFING DISH HANDLE CONFIGURED FOR SAFE CHAFING DISH PLACEMENT AND REMOVAL AND FOR NESTING CHAFING DISH STORAGE

(71) Applicants: Lois V. Leonard, Gibsonia, PA (US); Joseph L. Leonard, Gibsonia, PA (US)

(72) Inventors: Lois V. Leonard, Gibsonia, PA (US); Joseph L. Leonard, Gibsonia, PA (US)

(73) Assignee: Get-A-Grip Chafing Pans, LLC, Pittsburgh, PA (US)

( * ) Notice: Subject to any disclaimer, the term of this patent is extended or adjusted under 35 U.S.C. 154(b) by 0 days.

(21) Appl. No.: 13/735,846

(22) Filed: Jan. 7, 2013

(65) Prior Publication Data

US 2013/0186903 A1 Jul. 25, 2013

Related U.S. Application Data

(63) Continuation-in-part of application No. PCT/US2011/042927, filed on Jul. 5, 2011.

(60) Provisional application No. 61/361,478, filed on Jul. 5, 2010.

(51) Int. Cl.
*A47J 36/34* (2006.01)
*B65D 21/02* (2006.01)
*A47J 27/00* (2006.01)
*A47J 45/07* (2006.01)

(52) U.S. Cl.
CPC .............. *A47J 45/07* (2013.01); *A47J 27/002* (2013.01)
USPC .................. 220/573.1; 220/573.3; 220/573.4; 220/743; 220/648; 220/485; 220/23.87; 220/769; 220/753; 206/518

(58) Field of Classification Search
USPC .............. 220/573.1–575, 743, 647, 648, 485, 220/23.87, 23.89, 769, 771, 318, 753; 206/299, 514, 518; 294/27.1
See application file for complete search history.

(56) References Cited

U.S. PATENT DOCUMENTS

| | | | |
|---|---|---|---|
| 925,781 A | 6/1909 | Mathy | |
| 2,588,614 A | 3/1952 | Capra et al. | |
| 3,112,948 A | 12/1963 | Burns | |
| 3,179,287 A | 4/1965 | Richmeier, Jr. | |
| 4,106,486 A | 8/1978 | Lee | |
| 4,717,038 A * | 1/1988 | Anders | 220/769 |
| 5,045,672 A | 9/1991 | Scott | |
| 5,347,979 A | 9/1994 | Haber | |
| 5,503,062 A * | 4/1996 | Buff, IV | 99/426 |
| 5,511,467 A | 4/1996 | Motley et al. | |
| 5,517,903 A | 5/1996 | Kaufman | |

(Continued)

*Primary Examiner* — Fenn Mathew
*Assistant Examiner* — Jennifer Castriotta
(74) *Attorney, Agent, or Firm* — Blynn L. Shideler; Krisanne Shideler; BLK Law Group

(57) ABSTRACT

A chafing dish with handles allows a safe, efficient, and professional-appearing exchange and serving of food, keeping the servers hands away from the outer edge of the chafing dish where hot steam rises from the water pan. The chafing dish handles of the present invention are formed as part of a closed loop frame. The frame consists of rail members that are configured to align with and to be positioned beneath the chafing dish ledge. The rail members form a rectangular, depending on the shape of the chafing dish, structure. Handle members extend from the rail members on opposed sides of the frame and extend in a manner that does not prevent the lid placement or the nesting of chafing dishes in storage.

15 Claims, 6 Drawing Sheets

(56) References Cited

U.S. PATENT DOCUMENTS

| | | |
|---|---|---|
| 5,676,276 A | 10/1997 | Zielinski et al. |
| 5,819,640 A | 10/1998 | Cuomo et al. |
| 6,065,629 A * | 5/2000 | Sarnoff et al. ............... 220/315 |
| 6,092,670 A | 7/2000 | Marriott |
| 6,234,068 B1 | 5/2001 | Sherman |
| 6,705,210 B2 | 3/2004 | Leonard |
| 6,721,996 B2 | 4/2004 | Tippmann, Sr. |
| 7,344,173 B2 * | 3/2008 | Gonzalez et al. ............ 294/27.1 |
| 7,611,178 B2 | 11/2009 | Romsburg, Sr. et al. |

* cited by examiner

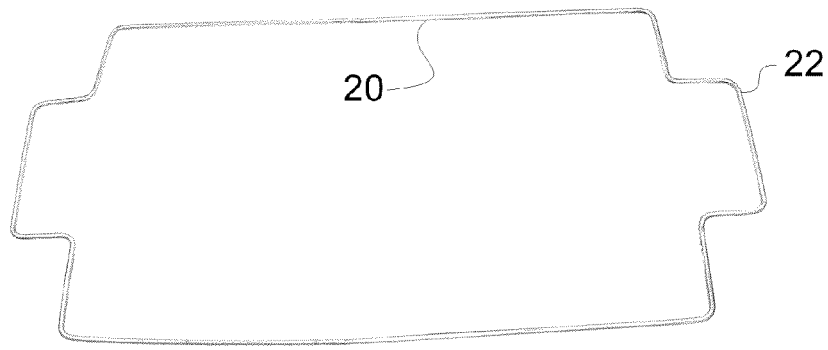
FIG. 7A
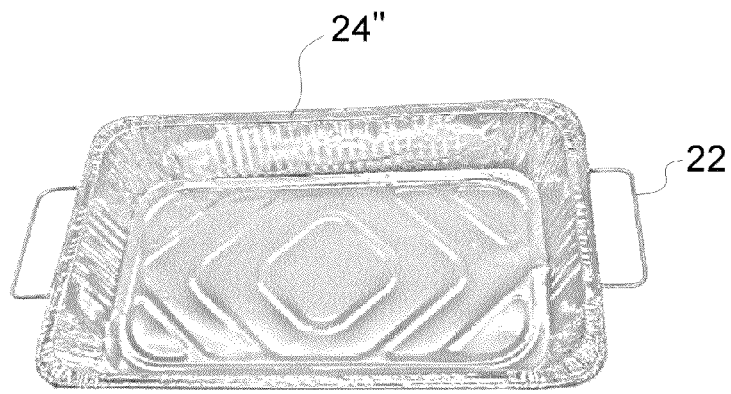
FIG. 7B
FIG 7C
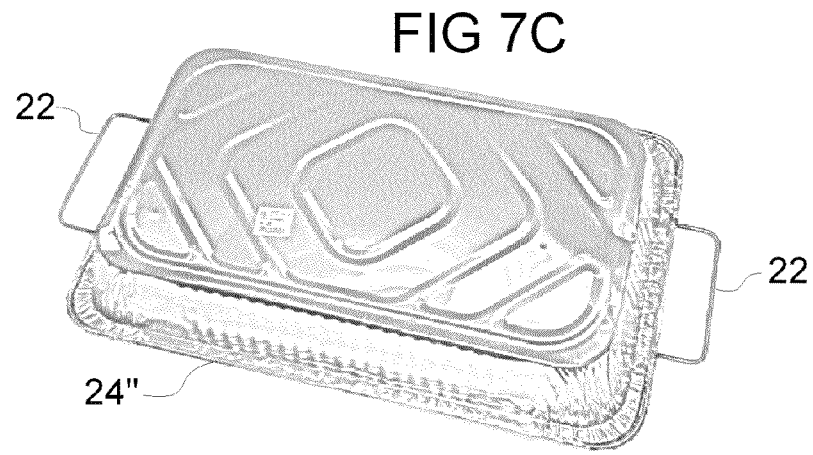

QUICK ATTACHING CHAFING DISH HANDLE CONFIGURED FOR SAFE CHAFING DISH PLACEMENT AND REMOVAL AND FOR NESTING CHAFING DISH STORAGE

The present invention is a continuation in part of international patent application PCT/US2011/042927 filed Jul. 5, 2011 and published as publication number 2012-006267 on Jan. 12, 2012, which publication is incorporated herein by reference. International patent application PCT/US2011/042927 claims priority of U.S. Provisional Patent Application Ser. No. 61/361,478 entitled "Quick Attaching Chafing Dish Handle Configured for Safe Chafing Dish Placement and Removal and for Nesting Chafing Dish Storage" filed Jul. 5, 2010.

BACKGROUND OF THE INVENTION

1. Field of the Invention

The invention relates to the field of catering apparatuses, and in particular to an improved chafing dish handle or holder for a chafing dish or food pan to assist in the exchange of hot chafing dishes and in the storage of chafing dishes when not in use.

2. Background Information

Chafing dishes, which are also referred to as food pans, steam tables, chafing pans, and buffet pans (collectively referred to herein as chafing dishes), are widely used for buffet-type food service, serving various kinds of hot and cold foods. Such chafing dishes, when serving hot foods, typically include a supporting water pan supported by an open frame bracing structure. One or more heat sources, such as steno burners, are placed below the water pan to heat the water in the pan. A chafing dish is supported by the water pan, typically above the level of the water. A lid is often provided to cover the chafing dish. Typically, both the water pan and the chafing dish will include an outwardly extending peripheral rim at an upper portion thereof. The peripheral rim of the water pan engages the open frame bracing structure to support the water pan. In a similar fashion, the peripheral rim of the chafing dish engages the peripheral rim of the water pan to support the chafing dish.

Representative examples of this construction are found in U.S. Pat. Nos. 5,045,672, 5,347,979 and 5,517,903 and 5,676,276. It is also possible with certain chafing dishes to utilize the chafing dishes and the open frame bracing structure without the intervening water pan, such as for food dishes served and maintained at room temperature. In this configuration, the chafing dish may be supported directly of the open frame bracing structure. For cold or chilled dishes the water pan can be used to support ice to cool the chafing dish without contacting the food The chafing dishes must be removed from the assembly periodically for various reasons. For instance, chafing dishes must be removed and replaced to replenish the food in the chafing dish assembly, and must be removed to clean the chafing dishes. Chafing dishes are sometimes described as being designed or configured to provide a close or tight seal between the chafing dish and the water pan so that the steam or cold air below the chafing dish will not escape around the edges of the chafing dish, however in practice no such seal is provided in most applications as ordinary wear and tear will provide variations in a surface such that no tight metal to metal seal is practical. Even without a tight "seal" per se in practice it is advantageous that the chafing dishes sit or seat evenly within the supporting structure and this engagement can be referenced as a seal within the meaning of this application.

The conventional prior art chafing dishes are typically constructed with a peripheral rim being either a planar flange having a down-turned outer edge or a planar ledge having an outwardly extending portion which rests on and provides an engagement surface for the water pan in which the chafing dish is placed. It is often difficult to remove such chafing dishes from the assembly.

In order to remove the chafing dishes, the edge of the chafing dish, which provides the engagement or seal with the water pan, must somehow be lifted from the water pan, by wedging a finger, utensil or other tool under the sealing rim. Such a procedure is difficult and can be dangerous since the chafing dish assembly may have a hot upper surface and/or hot escaping steam can burn the hand or finger of the person removing the chafing dish.

Commonly, persons removing the chafing dish may unwisely use something else, other than a pot holder, such as an apron that he or she is wearing to remove the chafing dish. This could result in the uneven handling of the chafing dish causing spills and/or burns to the food handler and/or patrons standing nearby while the transfer of hot food is taking place. Furthermore, aprons mistakenly being caught underneath of the chafing dish could quite possibly cause the whole chafing dish assembly to be pulled over as the worker leaves the area.

Attempts have been made to address this problem in the prior art. For example, U.S. Pat. No. 5,676,276 discloses a chafing dish with a notch in the sealing flange to provide a space between the chafing dish and the water pan into which serving utensils can be inserted to lift the chafing dish for easy grasping of the edge of the chafing dish. This solution still requires and encourages the inappropriate use of serving utensils and the like to pry the chafing dish upwards and unevenly handle the chafing dish.

Permanently attached handles have been used in other nested cookware such as draining baskets or strainers as shown in U.S. Pat. Nos. 2,588,614 and 4,106,486. U.S. Pat. No. 925,781 discloses a steamer arrangement with integral handles to facilitate handling. U.S. Pat. No. 6,705,210 provides a very effective attached handle solution as described in greater detail below, and this design, in practice, may represent a preferable solution for roll top chafing dishes as they are known in the art. U.S. Pat. No. 7,611,178 provides a more complex pan lifting implement. U.S. Pat. No. 6,721,996 provides another chafing dish handle solution.

U.S. Pat. Nos. 3,112,948 and 3,179,287 disclose special attachable chafing dish handles. The attachment of the handles to the chafing dishes in these designs encounter the same problems associated with moving the chafing dishes without the handles. These handles would also interfere with the sealing of the chafing dish and the water pan and the placement of the lid if the handles were left attached to the chafing dish. Finally, these handles represent another tool which the operator must store separately while the chafing dish assembly is being used, washed or stored. U.S. Pat. No. 6,092,670 discloses separable handles for manipulating a steam pan.

U.S. Pat. No. 5,511,467 discloses a chafing dish handling frame formed from cylindrical steel of a shape and size for surrounding a chafing dish under its lateral flange. The frame includes two handles positioned so as not to interfere with proper seating of the pan in the receptacle hole in the steam table. One embodiment of the pan handling device includes lid/pan clamps for securing the pan handling device to a steam table pan as well as for securing a pan lid to a pan such as when food is to be stored in a pan. This solution does not adequately address pan storage or frame attachment.

The strainers have been designed with a peripheral supporting ledge for supporting the strainer within another cooking vessel, typically containing water or oil. Due to the perforated nature of a strainer, the ledge does not form a seal with the underlying cookware. Consequently, removing a strainer from the cookware does not result in a sudden escape of steam as in chafing dish removal. Furthermore, such strainers are not commonly used for food presentation and service.

The conventional prior art chafing dishes are typically stored nested one inside of the other. Space considerations in restaurant environments can often be quite critical such that the compact storage of chafing dishes through nesting is deemed essential in certain environments, even if such nesting can make the dishes difficult to remove. Consequently any chafing dish handling development that significantly alters the nesting storage arrangement will severely limit their commercial applicability. The applicant's prior chafing dish handling solution is found in U.S. Pat. No. 6,705,210 (the '210 patent) and this solution addresses much of the prior art problems and it further avoids the problem of inseparable nesting chafing dishes by creating what is called a "fanned" nested arrangement of pans. However, this solution, which admittedly does require greater height in pan storage, has been less widely implemented in environments where storage space is deemed the most critical. A safety device such as in the '210 patent, is of little practical use if it is not actually implemented in practice. The disclosure of the '210 patent is incorporated herein by reference.

All of the above identified patents are incorporated herein by reference as they clearly supply information regarding the conventional construction of chafing dish stands and pans and the like as well as identifying the shortcomings of the state of the art. As evidenced in this prior art there is a need for additional chafing pan handle solutions which provide, for example, most of the advantages of the '210 patent while still allowing for nesting of the chafing pans. Thus there is a need for a chafing dish which can easily be removed from a water pan or open frame bracing structure which provides a seal between the chafing dish and the water pan and allows a lid to be placed on top.

SUMMARY OF THE INVENTION

The chafing dish and associated handles according to the present invention solves the difficulties inherent in prior art chafing dishes by providing a chafing dish which can easily be removed from a chafing dish assembly which provides a seal between the chafing dish and the water pan and allows a lid to be placed on top. The chafing dish of the present invention allows a safe, efficient, and professional-appearing exchange and serving of food, keeping the servers hands away from the outer edge of the chafing dish where hot steam rises from the water pan.

The chafing dishes and associated handles according to one embodiment of the present invention may have a generally rectangular configuration which includes a solid bottom panel and four solid walls extending upwardly there from. The four walls may include first and second end walls and first and second side walls. The end walls are joined to the side walls at curved corners thereof, and define a generally rectangular top opening. A top sealing flange extends outwardly from the four walls around the entire periphery of the walls. The sealing flange has a continuous planar lower surface so that when the chafing dish is placed in a water pan, the continuous planar lower surface is in intimate contact with the upper surface of the water pan around the periphery of the water pan. Thus, the chafing dish is in sealing engagement with the water pan when the chafing dish is placed therein.

The key component of the present invention is the provision of handles for the chafing dish. The chafing dish handles of the present invention are formed as part of a closed loop frame. The frame consists of rail members that are configured to align with and to be positioned beneath the chafing dish ledge. The rail members form a rectangular, depending on the shape of the chafing dish, structure. Handle members extend from the rail members on opposed sides of the frame and extend in a manner that does not effect the lid placement or the nesting of chafing dishes in storage.

Each handle includes an opening to receive the hands of the user to easily grip the chafing dish and remove the chafing dish from the water pan or the open frame bracing structure. The handles extend in a manner allowing a lid to be placed on top, and may provide for securing of the lid in certain embodiments. Handles are placed to keep hands sufficiently away from dangerous steam that rises from the water pan when removing the chafing dish from the water pan. Thus the handles on the chafing dishes of the present invention allow a safe, efficient and professional-appearing exchange and serving of food.

The frame additionally includes a frame attachment member to secure the frame and associated handles to the chafing dish. The frame attachment member may be in the form of a notch or groove in the elements forming the frame into which the outer edge of the ledge of the chafing dish can be received. A support bar may be positioned above the groove to enhance the ledge engaging structure. In these embodiments the notch and the support bar can act to engage and secure the lid which will help keep the lid in position in transport. An alternative frame attachment member is forming recessed lengths of the rail members that are selectively received in grooves formed in the chafing dish immediately below the dish ledge.

Further objects and advantages of the present invention will become apparent from a consideration of the drawings and ensuing description in which like reference numerals represent like elements throughout. It is an object of the present invention to address the deficiencies of the prior art discussed above and to do so in an efficient, cost effective manner.

BRIEF DESCRIPTION OF THE DRAWINGS

FIG. 1 B is a perspective view of a chafing dish with a quick attaching chafing dish handle in accordance with another embodiment of the present invention, wherein the chafing dish is shown as transparent for clarity;

FIG. 2 B is a perspective view of the quick attaching chafing dish handle of FIG. 1B;

FIG. 3 B is an enlarged side elevation view of the quick attaching chafing dish handle attachment to the chafing dish of the handle of FIG. 1B;

FIG. 3 C is an enlarged side elevation view of a quick attaching chafing dish handle attachment to the chafing dish of another modified embodiment of the present invention;

FIG. 7A is a perspective view of a chafing dish handle according to a different embodiment of the invention wherein the handle is designed for attachment to a disposable aluminum chafing dish;

FIG. 7B is a top perspective view of the chafing dish handle of FIG. 7A attached to a disposable aluminum chafing dish;

FIG. 7C is a bottom perspective view of the chafing dish handle of FIG. 7A attached to a disposable aluminum chafing dish;

DESCRIPTION OF THE PREFERRED EMBODIMENTS

Figure 1A:
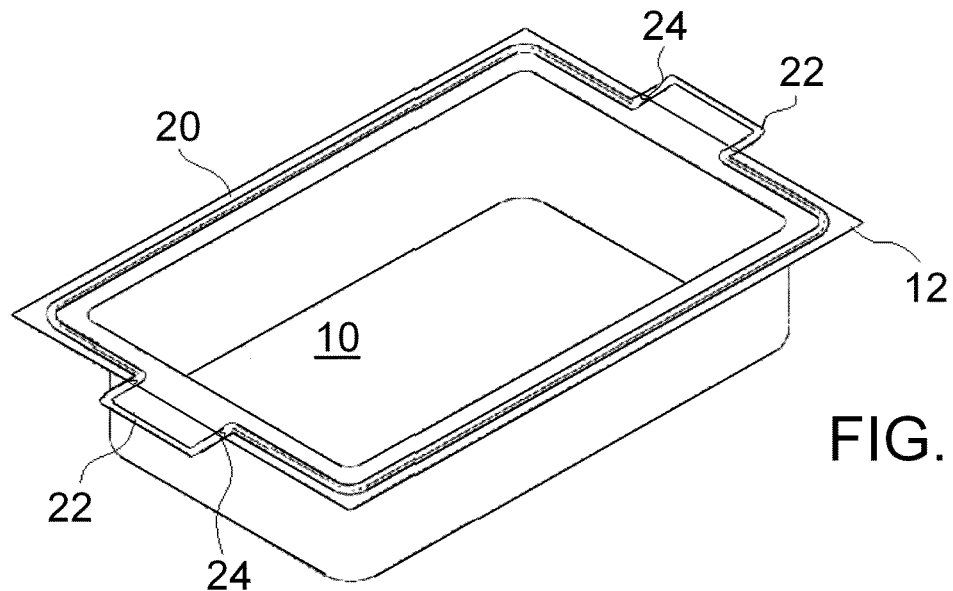
FIG. 1 A is a perspective view of a chafing dish with a quick attaching chafing dish handle in accordance with one embodiment of the present invention, wherein the chafing dish is shown as transparent for clarity.

In summary, the present invention relates to a chafing dish 10 and associated handles 22 configured to provide a safe exchange and serving of food by keeping the servers hands away from the outer edge 12 (also called the sealing flange or ledge) of the chafing dish 10 where hot steam rises from the water pan. The chafing dish 10 has a bottom panel and side walls extending upwardly there from defining a top opening, a top sealing flange ledge 12 extends outwardly from the side walls around the entire periphery of the walls. The present invention also includes a closed loop frame 20 including rail members that are configured to align with and to be positioned beneath the chafing dish ledge 12, and including handle members 22 extending from the rail members on opposed sides of the frame 20 and configured to extend in a manner that does not effect the lid placement or the nesting of chafing dishes 10 in storage, the frame 20 additionally includes a frame attachment member 24 to secure the frame 20 and associated handles 22 to the chafing dish 10.

Figure 1B:
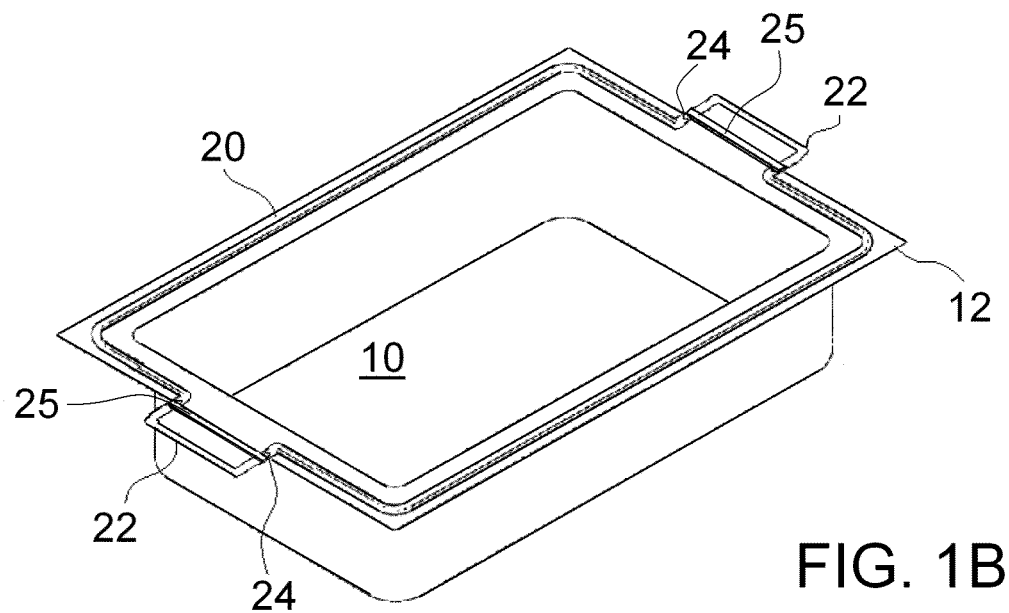

Chafing dish 10 is best shown in FIGS. 1A and 1B and has a generally rectangular planar bottom panel having the two long side walls and the two short side walls (end walls) extending upward there from, and a continuous top ledge 12. Side walls are joined to and merged with bottom panel at curved corners. The side walls define a top opening and terminate in the top ledge 12. The top ledge 12 extends outwardly from side walls around the entire periphery thereof and has a continuous planar lower surface so that when chafing dish 10 is placed in a water pan of a chafing dish assembly, the top ledge 12 will be in intimate, uninterrupted contact with an upper surface of the water pan. Thus, chafing dish 10 will be in sealing engagement with the water pan when it is located therein. The chafing dish assembly will additionally include the open frame bracing structure and the burners as known in the art.

The top opening is generally rectangular in shape with the exception of the curved corners. Chafing dish 10 preferably has two handles 22 located at first and second opposing ends or sidewalls of the dish 10.

Figure 4:
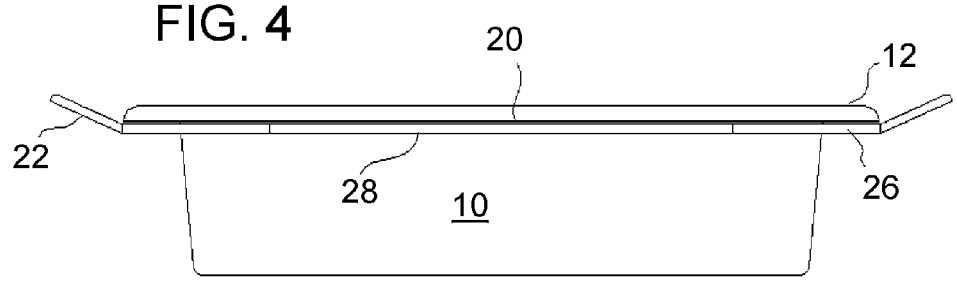
FIG. 4 is a side elevation view of a chafing dish with a quick attaching chafing dish handle in accordance with another embodiment of the present invention.

The chafing dish handles 22 of the present invention are formed as part of a closed loop frame 20. The frame 20 consists of rail members that are configured to align with and to be positioned beneath the chafing dish ledge 12 as shown. The rail members form a rectangular, depending on the shape of the chafing dish, structure. Handle members 22 extend from the rail members on opposed sides of the frame 20 and extend in a manner that does not effect the lid placement or the nesting of chafing dishes 10 in storage. They may be angled up as shown in FIG. 4 relative to the chafing dish to a degree that does not interfere with stacking and may make grasping easier, alternatively they can extend essentially straight as shown in FIGS. 1A and B. The frame 20 may easily be formed from round metal stock, such as ⅛-¼ inch stainless steel rods. Round rods for the frame can provide excellent tactile form for the handle elements 22 discussed below while a rectangular or square shape may engage the ledge 12 of the chafing dishes 10 more evenly.

Figure 2B:
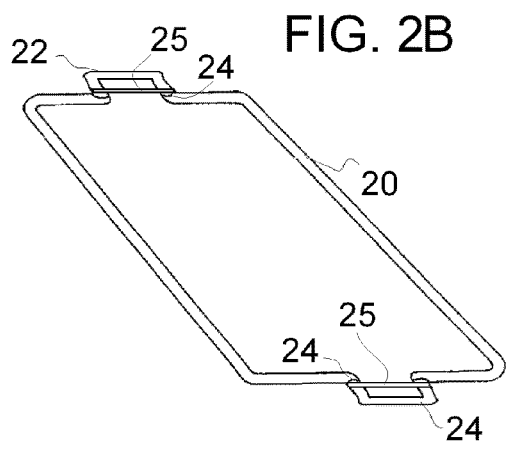
FIG. 2 A is a perspective view of the quick attaching chafing dish handle of FIG. 1A.
Figure 3B:
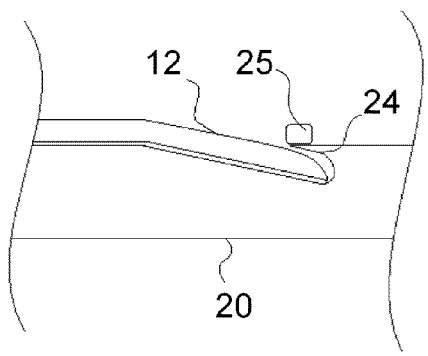
FIG. 3 A is an enlarged side elevation view of the quick attaching chafing dish handle attachment to the chafing dish of the handle of in FIG. 1A.
Figure 3A:
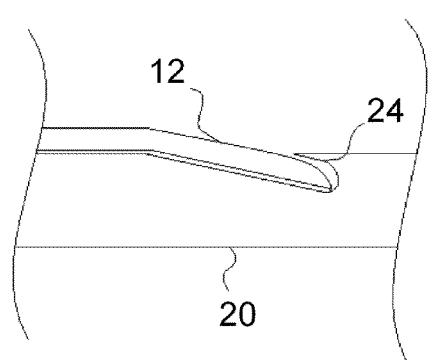
Figure 3C:
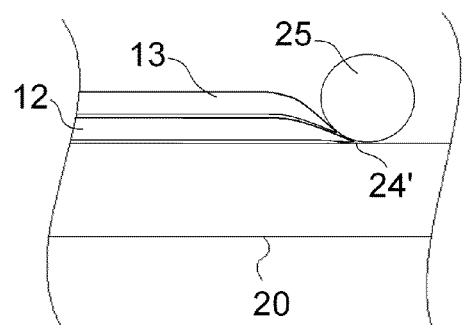

The frame 20 additionally includes a frame attachment member 24 to secure the frame 20 and associated handles 22 to the chafing dish 10. The frame attachment member 24 may be in the form of a notch or groove in the frame elements forming the frame 20 into which the outer edge of the ledge 12 of the chafing dish 10 can be received as shown in FIGS. 3A and 3B. In an alternative embodiment shown in FIGS. 1B, 2B and 3B a support bar 25 may be positioned above the groove to enhance the ledge engaging structure of member 24. It should be apparent in the embodiments shown in FIGS. 1B, 2B and 3B that the groove forming the attachment member 24 can be formed by adding material to the structure such as support bar 25, which embodiment is shown in FIG. 3C. FIG. 3C illustrates member 24' as essentially the space or notch beneath a round support bar 25 and the frame 20. In all these embodiments the member 24 and the support bar 25 can act to engage and secure the lid 13 which will help keep the lid in position in transport. The "lid lock" aspect is illustrated in FIG. 3C and will provide some advantages to those that are transporting the chafing dishes in vehicles as well as minimizing the loss of a lid during manual movement (e.g., if the server stumbles the lid 13 engagement with member 24 as shown in FIG. 3C lessens the likelihood of loss of the lid and chafing dish contents).

Figure 2A:
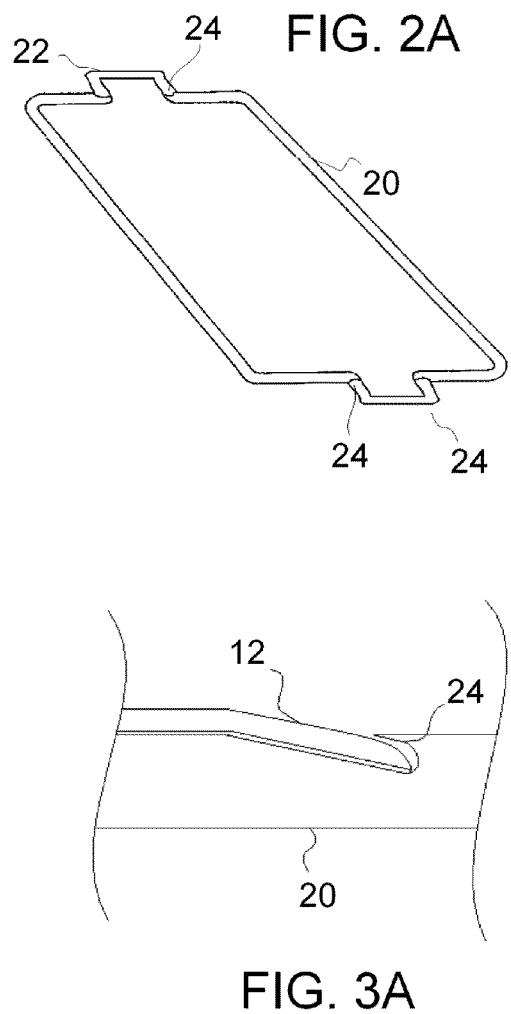
Figure 5:
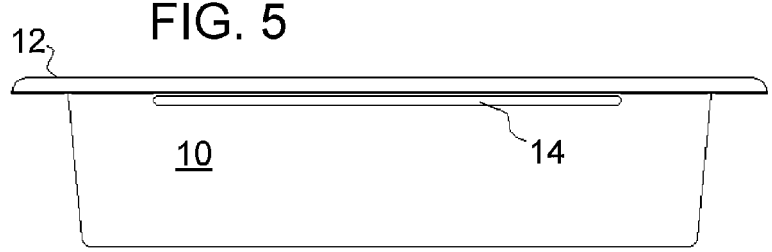
FIG. 5 is a side elevation view of the chafing dish of FIG. 4.
Figure 6:
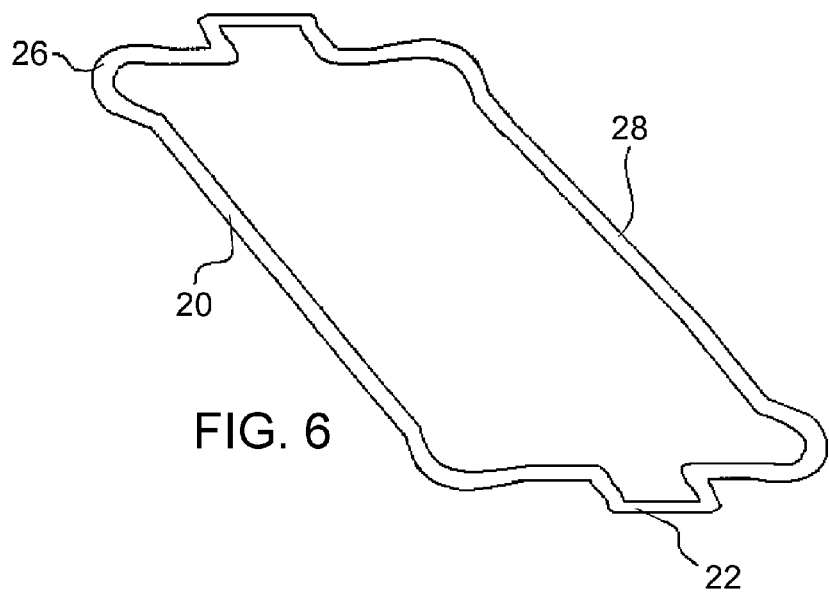
FIG. 6 is a perspective view of the chafing dish handle of FIG. 4.

An alternative frame attachment member 24 is shown in FIGS. 4-6 which comprises forming recessed lengths shown at 28 of the rail members that are selectively received in grooves 14 formed in the chafing dish 10 immediately below the dish ledge 12. This alternative attachment is also a snap fit type attachment however it requires a matching dish 10. It is an advantage of the embodiments of FIGS. 1-3 that the frames 10 of the earlier designs can be easily used with older or non-specialized dishes 10

The frame attaching members 24 will only be in use supporting the frame 20 when the dish 10 is not in the associated dish support frame/water pan or not being carried by handles 22. When the dish 10 and frame 20 are in the support frame assembly with the water pan, the frame 20 is acting mainly like a gasket between the ledge 12 and the water pan and so no separate attachment or holding mechanism is needed. Further, while the user is carrying the dish 10 through use of the handles 22 the frame 20 is being held by the user and is supporting the dish 10 through engagement with the ledge 12. The full support around substantially the entire ledge 12 provides a secure hold on the dish 10. Thus the frame attaching member 24 is important and in use when the dish 10 is not in the associated support frame/water pan and not being carried, such as in storage, or in the oven, or in prep stations in the kitchen. Yet in these situations the attaching structure formed by the frame attaching members 24 is critical to ensure use of the handles 22.

For moving the dish 10 the users hands are placed on handles 22 to lift the chafing dish 10 out from a water pan instead of on the ledge of the chafing dish as with use of prior art chafing dishes, thereby keeping the hands clear of dangerous rising steam. Prior art chafing dishes are frequently stacked, or nested for storage. The handles 22 of the chafing dishes 10 provide storage in which dish nesting is not interfered with. The handles 22 would also allow for hanging storage of the chafing dishes 10 and do not interfere with stacking of chafing dishes as discussed. The handles 22 of the invention may also provide some assistance in separating nested dishes 10 as prior art dishes are often stacked when hot and wet and become difficult to separate when they dry and cool. The frame 20 can provide a spacer member between nested dishes 10 that will act to prevent or at least minimize the "locking" of two nested dishes 10 together.

The handles 22 may be coated with an insulating grip-able, oven-safe material to further improve the function. The shape can be designed to more ergonomically fit the user's hands. FIG. 4 suggests an upward extending angle for the handles 22 relative to the frame 20; however a parallel orientation to the frame 20 is also anticipated. The handles 22 can be angled as shown, but should not significantly increase the overall height, if at all, of the dish 10 when attached. If the angle is too great (such as greater than about forty five degrees from horizontal) there is a risk that the combined assembly will no longer fit in all locations within an establishment's oven. Oven space in certain establishments is critical and limiting a dishes use to only selected racks is not helpful and could minimize the use of the frame 20 and thus minimize the safety advantages provided.

The frame 20 of the dish 10 is easily separated from the chafing dish 10 allowing a handful of frames 20 to be utilized with a large number of dishes 10, in the event a user did not want to invest in separate frames 20 for each dish 10. This design also allows for users to easily retrofit their existing dishes through application of frames 20 with handles 22. It should be noted that chafing dish 10 sizes are somewhat uniform in the industry, thus a single frame 20 can accommodate a number of distinct manufacturer's chafing dishes 10. Further the example shows a rectangular chafing dish 10, but the frame 20 can be implemented with round dishes 10, which are common for serving soups, for example. Any desired shape is possible.

Further a conventional assembly often accommodates two separate ½ size chafing dishes 10 or three ⅓ size chafing dishes 10, which are often used for offering two or three separate but related dishes (e.g. two or three different types of vegetable, or potatoes). The full size frame 20 could accommodate two ½ size dishes or three ⅓ size dishes, as should be appreciated by those of ordinary skill in the art, however this unnecessarily ties the dishes 10 together. Separate frames 20 could be shaped for the ½ and ⅓ sized dishes with the handles 22 placed (on the long side of the assembly) so as not to interfere with adjacent dishes 10.

Color-coded handles 22 could be used to aid in the identification of food in each chafing dish 10. Prior art chafing dishes offer no such identification. Thus while using color-coded handles 22, interpreting quickly what food is in which chafing dish and how long the food needs to be in the oven, minimizes the constant or prolonged time that the oven must be open to determine such criteria and minimizes the loss of heat from the oven.

The chafing dish 10 of the present invention with frame 20 and handles 22 solves the difficulties inherent in prior art chafing dishes by providing a chafing dish 10 which can easily be removed from a water pan of a chafing dish assembly, keeping hands clear of hot rising steam and which provides a significant seal between the chafing dish 10 and the water pan, and allowing a lid to be placed on top. The handles 22 of the present invention provides for conventional stacking storage. The chafing dish 10 allows a safe, efficient and professional-appearing exchange and serving of food, keeping hands clear of dangerously hot rising steam. It is one advantage that the chafing dish 10 of the present invention reduces the stress in an already stressful occupation. The handles 22 make preparing, exchanging and the overall handling of food safer than conventional prior art chafing dishes. Food servers need only someone to remove the empty chafing dish 10 while they replace it with the full chafing dish 10 of food. Even while using pot holders, a firm grip can be had easily, quickly, simply and safely.

FIGS. 7A-C illustrate an embodiment of the chafing dish handle 20 which is designed for attachment to a disposable aluminum chafing dish 10 shown in FIGS. 7B and C. As discussed above, with the handle 20 coupled to the dish 10 the associated handles 22 are configured to provide a safe exchange and serving of food by keeping the servers hands away from the outer edge 12 (also called the sealing flange or ledge) of the disposable aluminum chafing dish 10 where hot steam rises from the water pan. The disposable aluminum chafing dish 10 is shaped as described above and includes the similar bottom panel and side walls extending upwardly there from defining a top opening, a top sealing flange ledge 12 extends outwardly from the side walls around the entire periphery of the walls. This embodiment of the present invention also includes a closed loop frame 20 including rail members that are configured to align with and to be positioned beneath the chafing dish ledge 12, and including handle members 22 extending from the rail members on opposed sides of the frame 20 and configured to extend in a manner that does not effect the lid placement or the nesting of chafing dishes 10 in storage, the frame 20 additionally includes a frame attachment member 24" to secure the frame 20 and associated handles 22 to the chafing dish 10. As shown, in this embodiment the attachment member 24" is formation of the side rails sufficient such that the roll over edge of the aluminum pan 10 are wrapped around these side rails. It is possible to tack weld this handle 20 in place. Unlike the earlier designs this design is intended to be coupled by the manufacturer and typically discarded with the disposable aluminum pan. Thus this embodiment does not need to be reattached to distinct pans.

Figure 8A:
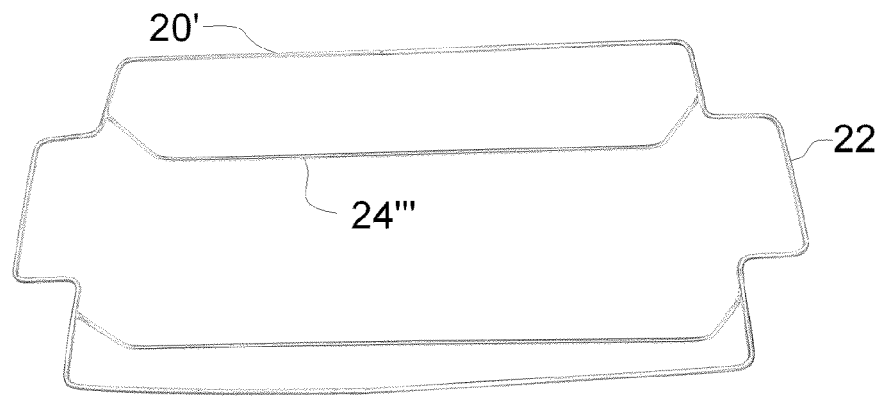
FIG. 8A is a top perspective view of a chafing dish handle-supporting frame according to a different embodiment of the invention wherein the handle is designed as a frame to support an associated chafing dish.
Figure 8C:
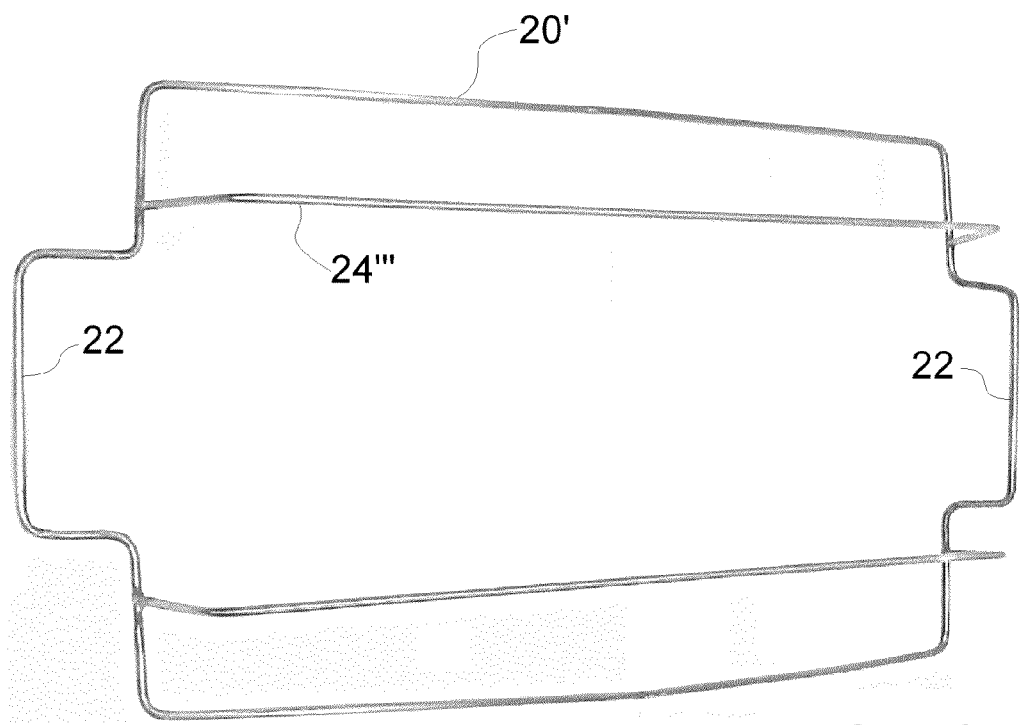
FIG. 8C is an enlarged rear perspective view of the chafing dish handle-supporting frame according to FIG. 8A.
Figure 8B:
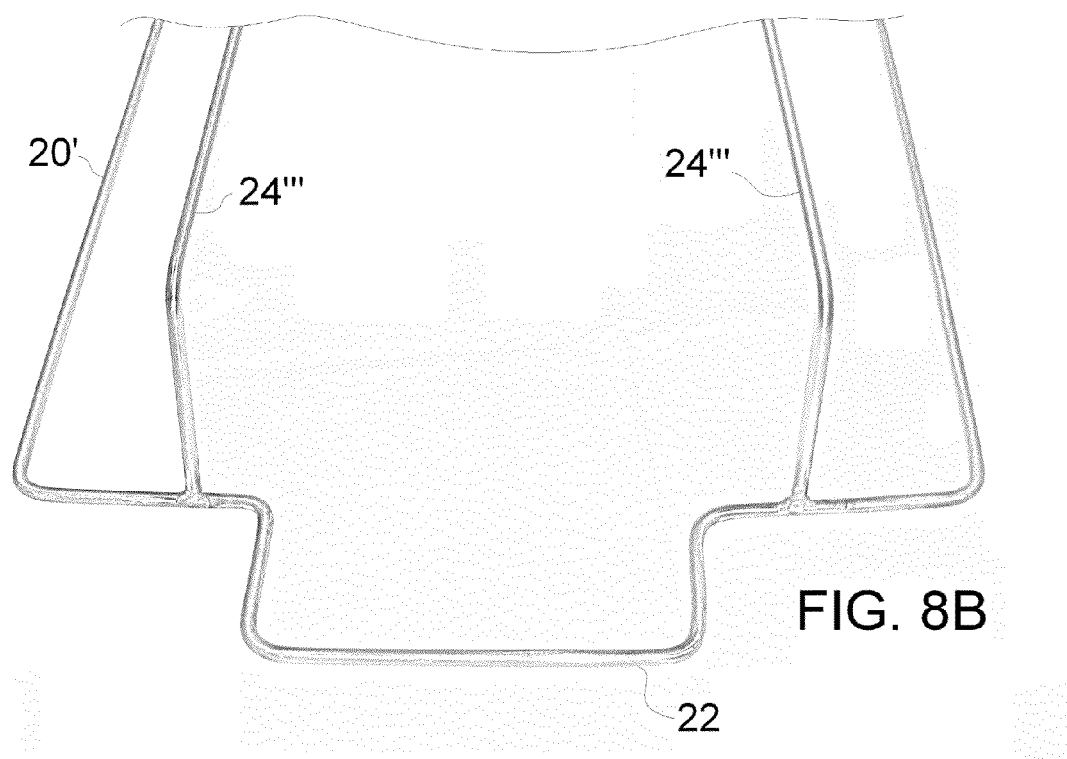
FIG. 8B is an enlarged rear perspective view of the chafing dish handle-supporting frame according to FIG. 8A.

FIGS. 8A-C illustrate a further expansion of the handle concept of the present invention and these illustrate a chafing dish handle-supporting frame 20' according to a different embodiment of the invention wherein the handle is designed as a frame to support an associated chafing dish 10. This embodiment of the present invention also includes a closed loop frame 20' including rail members that are configured to align with and to be positioned beneath the chafing dish ledge 12, and including handle members 22 extending from the rail members on opposed sides of the frame 20'. The frame 20' additionally includes frame legs 24''' configured to support the frame 20' and any associated chafing dish 10. The frame legs can be viewed as coupling the handle-frame 20' to the dish 10 analogous to the members 24 above, but they do not secure the handle frame 20' thereto.

It will be apparent to those of ordinary skill in the art that various modifications may be made to the present invention without departing from the spirit and scope thereof. For example the handles of FIGS. 1-6 could also be tack welded in place if movement between dishes 10 is no longer desired, however the above described releasable attachment is preferred for the advantages noted. The present invention is best defined by the appended claims and equivalents thereto.

What is claimed is:

1. A chafing dish handle comprising:
 a closed loop frame including a pair of spaced rail members that are each configured to align with and to be positioned beneath a chafing dish ledge, and
 handle members extending from the rail members on opposed sides of the frame and configured to extend from the frame in a manner that does not prevent the lid placement or the nesting of chafing dishes in storage;
 wherein the frame additionally includes a frame attachment member adjacent the handles to secure the frame and associated handles to the chafing dish, wherein each frame attachment member is formed as a space below an attached support bar coupled to one of the handle members.

2. The chafing dish handle of claim 1 wherein each attachment member is configured to engage an attached lid of the chafing dish.

3. The chafing dish handle of claim 2 wherein the frame is formed of round metal stock.

4. The chafing dish handle of claim 2 wherein the frame is formed of from ⅛-¼ inch stainless steel rods.

5. The chafing dish handle of claim 2 wherein the handle members are angled upward relative to the frame.

6. The chafing dish handle of claim 2 wherein the handle members are extending generally parallel relative to the frame.

7. The chafing dish handle of claim 2 wherein the handle members are color coded.

8. The chafing dish handle of claim 2 wherein the frame is substantially rectangular in plan view.

9. The chafing dish handle of claim 2 wherein the handle members are coated with an insulating grip-able, oven-safe material.

10. The chafing dish handle of claim 1 wherein the frame is formed of from ⅛-¼ inch stainless steel rods.

11. The chafing dish handle of claim 1 wherein the handle members are angled upward relative to the frame.

12. The chafing dish handle of claim 1 wherein the handle members are extending generally parallel relative to the frame.

13. The chafing dish handle of claim 1 wherein the handle members are color coded.

14. The chafing dish handle of claim 1 wherein the frame is substantially rectangular in plan view.

15. The chafing dish handle of claim 1 wherein the handle members are coated with an insulating grip-able, oven-safe material.

* * * * *